J. D. SMITH.
PULVERIZER.
APPLICATION FILED APR. 10, 1920.

1,375,425.

Patented Apr. 19, 1921.
3 SHEETS—SHEET 3.

Jesse D. Smith
INVENTOR.

Witness

BY Jerry A. Mathews
and
Lester L. Sargent
ATTORNEYS.

UNITED STATES PATENT OFFICE.

JESSE D. SMITH, OF HOLTON, INDIANA.

PULVERIZER.

1,375,425.  Specification of Letters Patent.  Patented Apr. 19, 1921.

Application filed April 10, 1920. Serial No. 372,771.

*To all whom it may concern:*

Be it known that I, JESSE D. SMITH, a citizen of the United States, residing at Holton, in the county of Ripley and State of Indiana, have invented a new and useful Pulverizer, of which the following is a specification.

The object of my invention is to provide a novel farm implement for preparing ground for sowing, and particularly for wheat sowing; to provide novel means for adjusting the implement so that the rollers may be disposed in either a V-shaped or in longitudinal alinement; and to provide means for keeping the machine from shifting sidewise when operating. These and other objects of my invention I attain by the mechanism illustrated in the accompanying drawings, in which—

Like numerals designate like parts in each of the several views.

Figure 1:
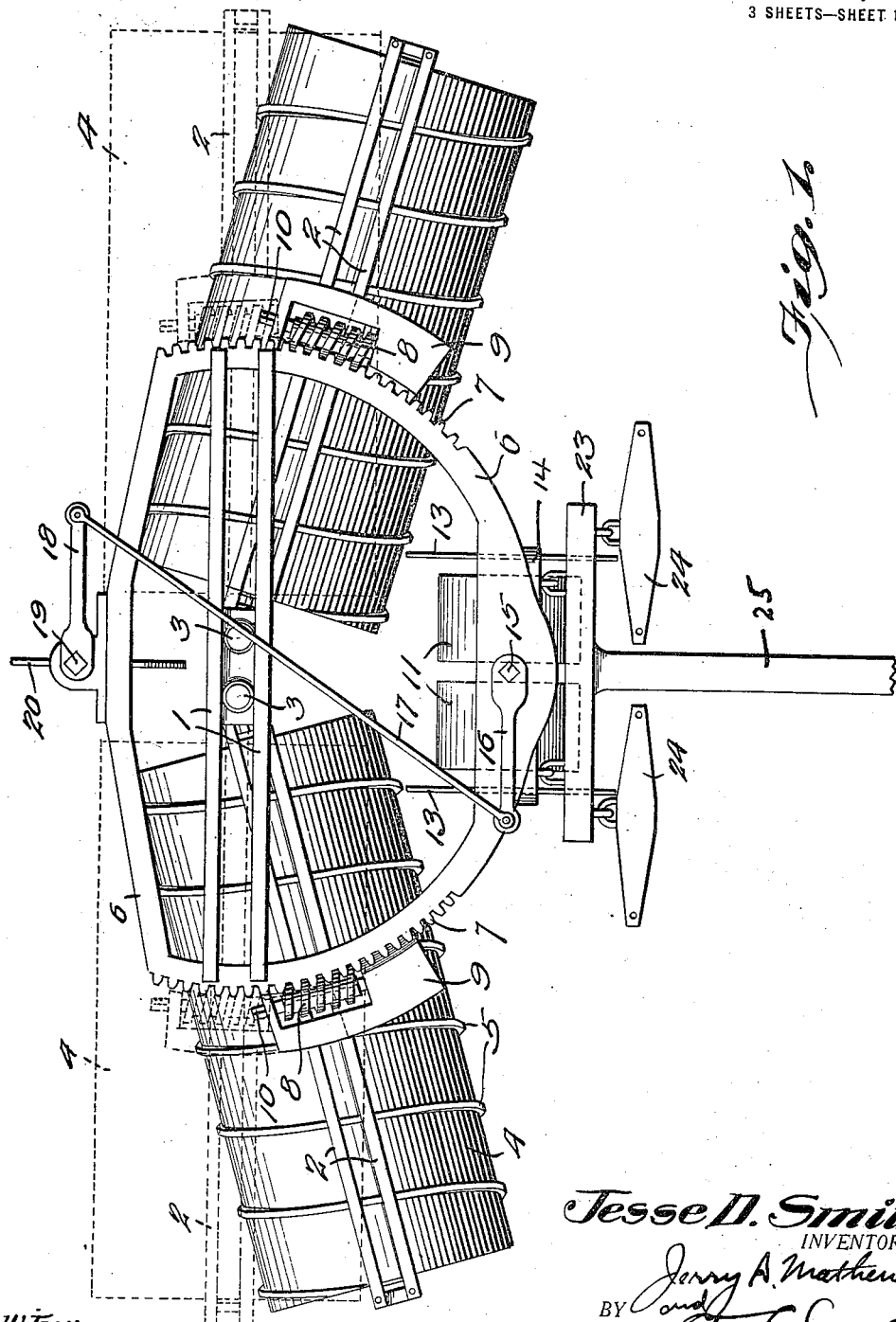
Figure 1 is a top plan of the invention with the rollers disposed in V-shaped arrangement as ordinarily employed, and with dotted lines illustrating the alined position of the rollers.
Figure 2:
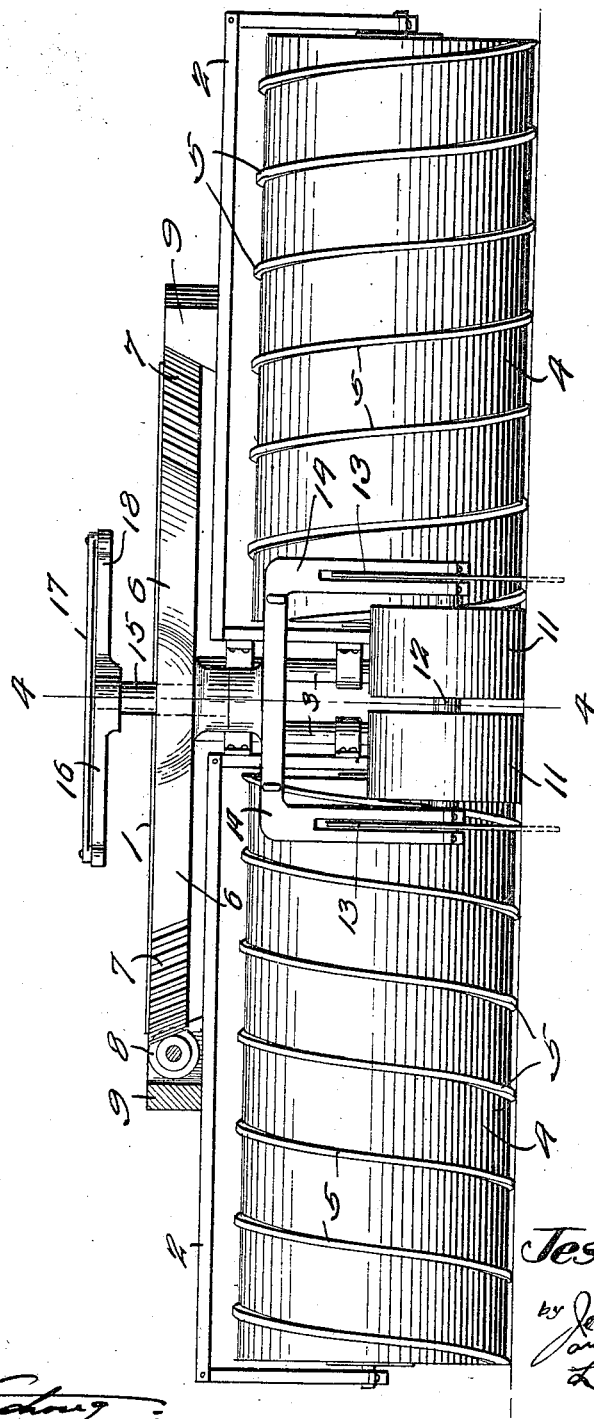
Fig. 2 is a front elevation of the machine, partly in section, but with the draw bar and pole omitted.
Figure 3:
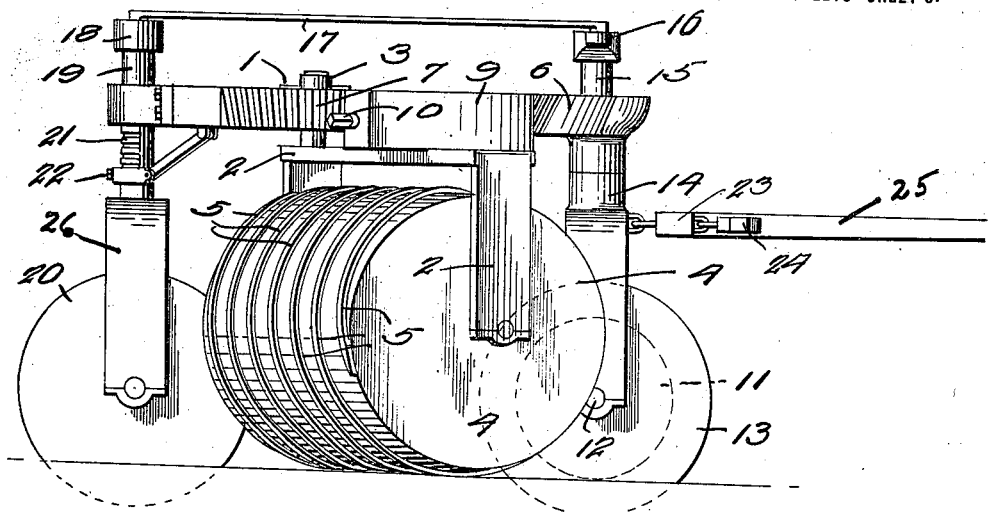
Fig. 3 is a side elevation of the invention.
Figure 4:
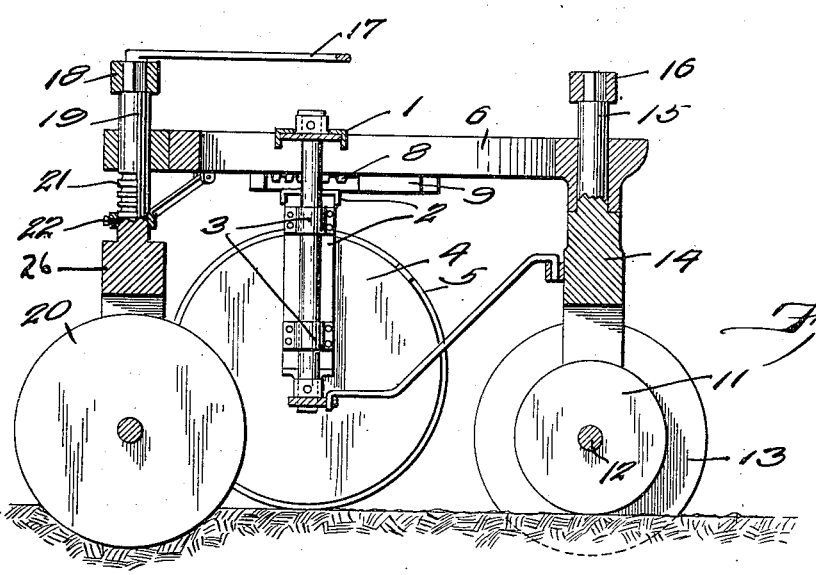
Fig. 4 is a section on line 4—4 of Fig. 2.

Referring to the accompanying drawings, I provide a frame 1 carrying vertical pivot rods 3, on which members are pivotally mounted the secondary frames 2. Rotatably mounted on frames 2 are large pulverizing rollers 4, each of which is provided with spiral ribs 5. Mounted on or integral with frame 1, I provide an arcuate frame 6 having oppositely disposed gear faces or racks 7. Rigidly mounted on secondary frames 2 are wheel supporting blocks 9 which hold the worms 8 in operative engagement with gear faces 7 of member 6, the latter being a stationary member. Worms 8 are provided with wrench ends 10 or other suitable means for turning the worms.

Mounted on the front portion of frame 6 I provide solid wheels 11 forming a truck, the wheels being mounted on an axle 12 which is mounted on a U-shaped frame 14, the arms of the latter frame 14 being bifurcated and carrying the disks 13 which serve as guides for the machine to prevent it from working sidewise. Attached to the frame 14 I may provide any suitable means for pulling the pulverizer, such for example a draw bar 23 having a pole 25 and whiffle trees 24. Rigidly mounted on truck frame 14 is a post 15 to which is rigidly attached the arm 16. To the other end of this arm a link 17 is pivotally attached, the link 17 having its other end pivotally attached to the end of the arm 18 which has its other end rigidly secured on a rear post 19 rotatably mounted in the rear portion of frame 6. Post 19 is attached to or may be made integral with a disk carrying frame 26 on which is mounted the rear guiding disk 20. Post 19 is provided with suitable adjusting grooves 21 adapted to be engaged by a locking pin member 22, by means of which the height of the post 19 and consequent depth of disk 20 may be regulated.

In operation when the front truck is turned in a given direction, its connection by post 15, arm 16, link 17, arm 18 and post 19 to the frame 26 which carries the rear disk 20, causes that disk to turn in a direction the reverse of that taken by the front truck and the disks 13 which are mounted on the front truck as will be understood by reference to Fig. 1. Arm 16 is disposed in a reverse direction from arm 18, as illustrated. The pulverizing rollers 4 are disposed in V-shaped arrangement when the machine is used in leveling and packing the soil for sowing grain. But to facilitate moving the machine from one field to another they may be shifted to a longitudinally alined position, such as shown by dotted lines in Fig. 1 by operating worms 8 by means of their wrench ends 10, the engagement of worms 8 with the gear face 7 of frame member 6 effecting the desired adjustment. The spiral ribs on rollers 4 and the disposition of the rollers in their normal V-shaped arrangement increases the efficiency of the machine in pulverizing, packing and leveling the ground.

What I claim is:

1. In a farm implement of the class described, the combination of a main frame including opposite gear faces, secondary frames pivotally mounted on the main frame and carrying worms in operative engagement with the gear faces of the main frame, means for adjusting said worms to change the position of the rollers relative to the main frame, spirally ribbed rollers mounted on the secondary frames, a front truck, and means operatively connected to the front truck for steering the apparatus, said means including reversely controlled guiding disks.

2. In an apparatus of the class described, the combination of a main frame having opposite curved gear faces, secondary frames on which ribbed rollers are mounted, worms mounted on said secondary frames, said worms being in operative engagement with the gear faces of the main frame, said worms having wrench ends for operating the worms to a desired position relative to the gear faces on the main frames, whereby the rollers may be shifted from a longitudinally alined position to an approximately V-shaped position, and means for guiding and controlling the direction of travel of the apparatus, substantially as described.

3. In a farm implement of the class described, the combination of a main frame, secondary frames suitably mounted on the main frame and adapted to be swung to a longitudinally alined position or to a V-shaped arrangement, rollers carried by said frames, adjusting means carried by the secondary frames and having an operative engagement with the main frame, a truck pivotally mounted on the front end of the main frame, and guiding disks carried by said truck and adapted to prevent the machine from moving sidewise.

4. In combination with the apparatus described in claim 3 a guiding disk pivotally mounted on the rear portion of the main frame, and means linking the disk to the disks carried by the front truck, whereby the disks will co-act in guiding the machine.

5. In a farm implement of the class described, the combination of a main frame, secondary frames suitably mounted on the main frame and adapted to be swung to a longitudinally alined position or to a V-shaped arrangement, ribbed rollers carried by said secondary frames, means carried by the secondary frames for adjusting their position relative to the main frame and to each other, a truck pivotally mounted on the front portion of the main frame, guiding disks carried by said truck, a post mounted on said truck and extending up through the main frame, an arm rigidly mounted on said post, a link having one end pivoted to the outer end of said arm and extending diagonally to the rear of the machine, a rear arm to the outer end of which the rear end of said link is pivotally attached, a post pivotally mounted in the frame and to which said arm is affixed, a disk-carrying member carried by said post, and a disk carried by said member.

6. In combination with the apparatus described in claim 5 means for adjustably supporting the aforesaid rear disks at a desired elevated position, substantially as shown.

JESSE D. SMITH.